(12) United States Patent
Saneto et al.

(10) Patent No.: US 10,578,915 B2
(45) Date of Patent: Mar. 3, 2020

(54) LIQUID CRYSTAL DISPLAY DEVICE

(71) Applicant: FUJIFILM Corporation, Tokyo (JP)

(72) Inventors: Ryuji Saneto, Kanagawa (JP); Yuuichi Fukushige, Kanagawa (JP); Masato Nagura, Kanagawa (JP); Hitoshi Namikawa, Kanagawa (JP); Takashi Tamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 131 days.

(21) Appl. No.: 15/958,290

(22) Filed: Apr. 20, 2018

(65) Prior Publication Data

US 2018/0246376 A1    Aug. 30, 2018

Related U.S. Application Data

(63) Continuation of application No. PCT/JP2016/080577, filed on Oct. 14, 2016.

(30) Foreign Application Priority Data

Oct. 30, 2015 (JP) ................. 2015-214339

(51) Int. Cl.
*G02F 1/1335* (2006.01)
*G02B 5/30* (2006.01)
*G02F 1/35* (2006.01)

(52) U.S. Cl.
CPC .. *G02F 1/133602* (2013.01); *G02F 1/133504* (2013.01); *G02F 1/133528* (2013.01); *G02F 1/133606* (2013.01); *G02B 5/3033* (2013.01); *G02F 2001/133567* (2013.01); *G02F 2001/3505* (2013.01); *G02F 2201/50* (2013.01)

(58) Field of Classification Search
CPC ... G02F 1/133528; G02F 2001/133567; G02F 1/133602; G02F 1/133606; G02F 2001/133607
See application file for complete search history.

(56) References Cited

U.S. PATENT DOCUMENTS

| | | | | |
|---|---|---|---|---|
| 7,030,944 B2* | 4/2006 | Fujimoto | .......... | G02F 1/133528 349/112 |
| 8,673,182 B2* | 3/2014 | Wakizaka | ............... | G02B 1/111 252/500 |
| 9,431,632 B2* | 8/2016 | Inoue | .................... | G02B 5/045 |
| 2008/0186429 A1* | 8/2008 | Hamamatsu | .......... | G02B 5/0242 349/64 |
| 2012/0231217 A1* | 9/2012 | Sasada | .................... | G02B 1/04 428/141 |

FOREIGN PATENT DOCUMENTS

| | | |
|---|---|---|
| JP | H0634972 A | 2/1994 |
| JP | 2001042125 A | 2/2001 |
| JP | 2011242581 A | 12/2011 |
| KR | 20110073928 A | 6/2011 |

OTHER PUBLICATIONS

International Search Report issued in PCT/JP2016/080577 dated Dec. 13, 2016.
Written Opinion issued in PCT/JP2016/080577 dated Dec. 13, 2016.
International Preliminary Report on Patentability completed by WIPO on May 1, 2018, in connection with International Patent Application No. PCT/JP2016/080577.

\* cited by examiner

*Primary Examiner* — Paisley L Wilson
(74) *Attorney, Agent, or Firm* — Edwards Neils LLC; Jean C. Edwards, Esq.

(57) ABSTRACT

A liquid crystal display device has a liquid crystal panel including a liquid crystal cell and a polarizing plate; and a backlight unit including a light source. An outermost surface of the liquid crystal panel on the backlight unit side is a surface of a protective film included in the polarizing plate, an outermost surface of the backlight unit on the liquid crystal panel side is a surface of a diffusion member, and where an arithmetic mean roughness measured on an outermost surface of the liquid crystal panel on the backlight unit side is Ra1, a pencil hardness is P1, an arithmetic mean roughness measured on an outermost surface of the backlight unit on the liquid crystal panel side is Ra2, and a pencil hardness is P2, Expression 1: 33 nm<Ra1<135 nm, Expression 2: Ra2<15 nm, and Expression 3: P1<P2 are satisfied.

13 Claims, No Drawings

LIQUID CRYSTAL DISPLAY DEVICE

CROSS-REFERENCE TO RELATED APPLICATIONS

This application is a Continuation of PCT International Application No. PCT/JP2016/80577, filed on Oct. 14, 2016, which was published under PCT Article 21(2) in Japanese, and which claims priority under 35 U.S.C. § 119(a) to Japanese Patent Application No. 2015-214339, filed on Oct. 30, 2015. The above applications are hereby expressly incorporated by reference, in their entirety, into the present application.

BACKGROUND OF THE INVENTION

1. Field of the Invention

The present invention relates to a liquid crystal display device.

2. Description of the Related Art

In the liquid crystal display device, a backlight unit and a liquid crystal panel are included. As the constituent member of the backlight unit, a member (a diffusion member) having light diffusibility which is called a diffusion plate, a diffusion sheet, or the like is widely used (see JP1994-34972A (JP-H06-34972A)).

SUMMARY OF THE INVENTION

The configuration of a liquid crystal display device is, more specifically, as follows. The liquid crystal panel includes a liquid crystal cell and a polarizing plate. The polarizing plate at least includes a polarizer, and a protective film (polarizing plate protective film) is generally laminated on one or both surfaces of the polarizer, so as to prevent the polarizer from being scratched. In the liquid crystal display device, generally, a liquid crystal panel to which a liquid crystal cell and a polarizing plate are incorporated is disposed via a backlight unit including a light source and various members (for example, the diffusion member) and clearance (also called a gap or an air layer).

JP1994-34972A (JP-H06-34972A) discloses a liquid crystal display device in which a member of a backlight unit that is disposed closest to a liquid crystal panel (in JP1994-34972A (JP-H06-34972A), referred to as a liquid crystal display element) is a diffusion member (diffusion plate). The present inventors consider that, in a case where a member positioned closest to the liquid crystal panel side in the backlight unit in this manner is a diffusion member, it is effective to improve the brightness on the display surface of the liquid crystal display device. However, the present inventors have reviewed a liquid crystal display device in which a member of the backlight unit positioned closest to the liquid crystal panel side is a diffusion member and a member of the liquid crystal panel that is positioned closest to the backlight unit side is a protective film of the polarizing plate, and it was clear that it was not easy to achieve both of the improvement of brightness and the satisfactory display performance.

Here, an object of the present invention is to achieve both of the improvement of the brightness and the improvement of the display performance in the liquid crystal display device.

An aspect of the present invention is a liquid crystal display device comprising:
 a liquid crystal panel at least including a liquid crystal cell and a polarizing plate; and a backlight unit at least including a light source,
 in which an outermost surface of the liquid crystal panel on the backlight unit side is a surface of a protective film (hereinafter, referred to as a "polarizing plate protective film") included in the polarizing plate,
 in which an outermost surface of the backlight unit on the liquid crystal panel side is a surface of a diffusion member included in the backlight unit, and
 in which, in a case where an arithmetic mean roughness measured on an outermost surface of the liquid crystal panel on the backlight unit side is set as Ra1, a pencil hardness measured on an outermost surface of the liquid crystal panel on the backlight unit side is set as P1, an arithmetic mean roughness measured on an outermost surface of the backlight unit on the liquid crystal panel side is set as Ra2, and a pencil hardness measured on an outermost surface of the backlight unit on the liquid crystal panel side is set as P2, Expressions 1 to 3 are satisfied.

$$33 \text{ nm} < Ra1 < 135 \text{ nm} \qquad \text{Expression 1:}$$

$$Ra2 < 15 \text{ nm} \qquad \text{Expression 2:}$$

$$P1 < P2 \qquad \text{Expression 3:}$$

In the present invention and the present specification, a diffusion member refers to a member having a haze in the range of 50% to 100%. The haze is a value measured in the environment of the temperature of 25° C. and a relative humidity of 60%, by using a haze meter, in conformity with JIS K 7136 (2000). As the haze meter, for example, HGM-2DP manufactured by Suga Test Instruments Co., Ltd. may be used. The diffusion member is preferably a sheet-like member (diffusion sheet). According to the present invention and the present specification, the term "sheet" is used in the same meaning as a film.

According to the present invention and the present specification, the arithmetic mean roughness Ra is a value measured by an atomic force microscope (AFM), in a measured area of 100 μm×100 μm on a measurement target surface, in conformity with JIS B 0601:2013. Hereinafter, the arithmetic mean roughness is also referred to as a surface roughness.

According to the present invention and the present specification, the pencil hardness is measured by the following method.

A member or an article having a measurement target surface is humidified under the conditions of a temperature of 25° C. and a relative humidity of 60% for two hours. After the humidification, scratching a measurement target surface by using a test pencil regulated by JIS-S6006 according to a pencil hardness evaluation method regulated by JIS K 5400 with a test pencil of each hardness by using a weight of 500 g is performed at 10 different positions of the measurement target surface (scratch test). Among test pencils used in scratch tests in which scratches due to the scratching are visually observed at five or fewer positions out of 10 positions, the hardness of the test pencil having the greatest hardness is set as the pencil hardness of the evaluation target surface. In JIS K 5400, it is disclosed that the scratch is the tear of the coating film and the abrasion of the coating film and does not include the indentation of the coating film, but in this measurement, the indentation in the surface of the measurement target is also determined as the scratch. As well-known in the art, the pencil hardness means that the great hardness is, for example, in an order of B<HB<H<2H<3H. For example, in a case where a pencil hardness measured in a certain surface is H, and a pencil hardness measured in another surface is HB, the surface of the pencil hardness H has a greater hardness than the surface of the pencil hardness HB. Hereinafter, unless described otherwise, the hardness refers to the pencil hardness.

The pencil hardness of the protective film surface which is an outermost surface of the liquid crystal panel which is the backlight unit side may be measured in the form of the single body of the protective film, may be measured on a polarizing plate to which the protective film is incorporated, and may be measured in the liquid crystal panel to which the polarizing plate is incorporated. The pencil hardness of the diffusion member surface on the outermost surface of the backlight unit on the liquid crystal panel side may be measured in the form of the single body of the diffusion member and may be measured in the form in which the diffusion member is laminated with one or more other members of the backlight unit. The same is applied to the measurement relating to various films or members such as the measurement of the arithmetic mean roughness in the present invention and the present specification.

According to an aspect, the backlight unit includes a light collecting member between the diffusion member and the light source. The light collecting member is a member having a light collecting function that collects light incident from the surface on the light source side on the other surface side. The light collecting member is preferably a sheet-like member (light collecting sheet). Meanwhile, the diffusion member may have or may not have a light collecting function. In a case where the diffusion member has the light collecting function, it is preferable that the light collecting function of the light collecting member is better than the light collecting function of the diffusion member.

According to one aspect, the arithmetic mean roughness Ra3 measured on the surface of the diffusion member on the light source side is more than 500 nm to 10,000 nm or less. The surface of the diffusion member on the light source side refers to the surface on the opposite side of the diffusion member surface which is the outermost surface of the backlight unit.

According to one aspect, the protective film is a resin film including a particle having the average particle diameter in the range of 0.1 to 6.0 μm.

According to the present invention and the present specification, the average particle diameter of the particle is an average primary particle diameter and may be obtained by acquiring a cross section TEM picture of a film or a member by a transmission electron microscope (TEM), measuring a particle diameter of each particle included in the cross section TEM picture, and calculating an average value. In addition, a particle may be formed as a solvent dispersion sol, and the average particle diameter may be obtained as a 50% average particle diameter in this sol. The 50% average particle diameter may be obtained using, for example, Nanotrac particle size analyzer manufactured by Nikkiso Co., Ltd. The shape of the particle may be a spherical shape or a non-spherical (irregular) shape. The particle diameter of the particle having an irregular shape refers to an average value of a major axis length and a minor axis length of the particle.

According to the present invention and the present specification, a "resin film" refers to a film including a resin as a structural component. The "resin" refers to a polymer of two or more polymerizable compounds having the same or different structures and may be a homopolymer or a copolymer.

According to an aspect, the protective film is an acrylic resin film.

According to one aspect, the protective film is an acrylic resin film including an acrylic resin particle having the average particle diameter in the range of 0.1 to 6.0 μm.

According to the present invention and the present specification, an "acrylic resin particle" refers to a particle including an acrylic resin as a structural component. An "acrylic resin" refers to a polymer of a derivative of methacrylic acid and/or a derivative of acrylic acid. Hereinafter, a derivative of methacrylic acid and/or a derivative of acrylic acid is also referred to as a (meth)acrylic acid derivative. The derivative is, for example, ester.

According to an aspect, the protective film is a cellulose acylate film.

The liquid crystal display device according to the present invention may exhibit high brightness and satisfactory display performance.

DESCRIPTION OF THE PREFERRED EMBODIMENTS

The following description may be made based on a representative embodiment of the present invention, but the present invention is not limited to the embodiment. According to the present invention and the present specification, the numerical range expressed by using "to" means a range including numerical values described before and after "to" as a lower limit value and an upper limit value.

The liquid crystal display device according to the present invention has a liquid crystal panel at least including a liquid crystal cell and a polarizing plate; and a backlight unit at least including a light source, an outermost surface of the liquid crystal panel on a backlight unit side is a surface of a protective film included in the polarizing plate, an outermost surface of the backlight unit on the liquid crystal panel side is a surface of a diffusion member included in the backlight unit, and in a case where an arithmetic mean roughness measured on an outermost surface of the liquid crystal panel on the backlight unit side is set as Ra1, a pencil hardness measured on an outermost surface of the liquid crystal panel on the backlight unit side is set as P1, an arithmetic mean roughness measured on an outermost surface of the backlight unit on the liquid crystal panel side is set as Ra2, and a pencil hardness measured on an outermost surface of the backlight unit on the liquid crystal panel side is set as P2, Expressions 1 to 3 are satisfied.

$$33 \text{ nm} < Ra1 < 135 \text{ nm} \qquad \text{Expression 1:}$$

$$Ra2 < 15 \text{ nm} \qquad \text{Expression 2:}$$

$$P1 < P2 \qquad \text{Expression 3:}$$

The present inventors assume the liquid crystal display device to be as follows. However, the below is a guess, and does not limit the present invention at all.

(1) In the backlight unit of the liquid crystal display device, a member positioned closest to the liquid crystal panel side is a diffusion member, and this diffusion member surface is an outermost surface of the backlight unit on the liquid crystal panel side. As described above, the present inventors consider that, with respect to the liquid crystal display device, in a case where a member positioned closest to the liquid crystal panel side in the backlight unit in this manner is a diffusion member, it is effective to improve the brightness on the display surface of the liquid crystal display device. With respect to the liquid crystal display device to which the backlight unit having such a configuration is incorporated together with the liquid crystal panel in which an outermost surface on a backlight unit side is a protective film surface of the polarizing plate, examples of the reason that the display performance decreases include the generation of the light leak on the display surface. The present inventors consider that this light leak is caused by a scratch generated on an outermost surface (diffusion member surface) of the backlight unit on the liquid crystal panel side and/or on the outermost surface (protective film surface) of the liquid crystal panel on the backlight unit side, due to the contact between the backlight unit and the liquid crystal panel. With respect to the scratch, the present inventors consider that, recently, since there is a tendency of narrowing the clearance between the liquid crystal panel and the backlight unit in order to thin the liquid crystal display device or the liquid crystal panel becomes large and is easily bent, the outermost surface of the backlight unit on the liquid crystal panel side and the outermost surface of the liquid crystal panel on the backlight unit side easily come into contact with each other, and thus a scratch is easily generated.

(2) With respect to this, the present inventors diligently conducted research and newly found that, in the liquid crystal display device in which the surface roughness (arithmetic mean roughness) and the hardness (pencil hardness) of the outermost surface of the liquid crystal panel on the backlight unit side and the outermost surface of the backlight unit on the liquid crystal panel side satisfy Expressions 1 to 3, the display performance is satisfactory, and the brightness on the display surface is high. Details thereof are as follows.

(3) In a case where Expressions 1 and 2 are satisfied, the protective film surface that is the outermost surface of the liquid crystal panel on the backlight unit side is in a rougher state than the diffusion member surface that is the outermost surface of the backlight unit on the liquid crystal panel side. The present inventors considered that, in a case where Expression 3 is satisfied in this state, that is, the diffusion member surface has greater hardness than the protective film surface, it is possible to prevent the scratch on the diffusion member surface which is a smoother surface due to the contact with the protective film surface which is a rougher surface.

(4) It is considered that one of the reasons for the decrease of the display performance is the generation of the scratch, but according to the research of the present inventors, it was confirmed that, in a case where both of the surfaces were caused to be smooth in order to suppress the generation of the scratch, the display unevenness that was considered to be caused by the contact between the surfaces was generated. The confirmed display unevenness was concentric circular interference fringes called Newton rings. Accordingly, the present inventors assume that, in a case where the protective film surface is caused to be a state of satisfying Expression 1, specifically, a state in which Ra1 is more than 33 nm, the mirror surface component in a case where the light incident on the display surface side of the outermost surface of the liquid crystal panel on the backlight unit side is reflected may be decreased, and accordingly the generating of the display unevenness (Newton ring) may be suppressed.

(5) With respect to the brightness improvement, the present inventors consider that a state in which the protective film surface which is the outermost surface of the liquid crystal panel on the backlight unit side satisfies Expression 1, specifically, a state in which Ra1 is less than 135 nm contributes the brightness improvement. Specifically, the present inventors consider that the decrease of the brightness due to the diffusion of the light emitted from the backlight unit on the protective film surface may be suppressed by causing Ra1 to be less than 135 nm.

The above is the assumption on the liquid crystal display device by the present inventors. However, the above is merely a guess, and does not limit the present invention at all, as described above.

Hereinafter, the liquid crystal display device is specifically described.

[Liquid Crystal Panel]

<Polarizing Plate>

The liquid crystal panel at least includes a liquid crystal cell and a polarizing plate. It is preferable that the liquid crystal panel includes a front-side polarizing plate, a liquid crystal cell, and a rear polarizer. With respect to the liquid crystal panel, the "front-side polarizing plate" is a polarizing plate positioned on the viewer side among the two polarizing plates in a case where the liquid crystal panel is incorporated in the liquid crystal display device together with the backlight unit, and the "rear polarizer" is a polarizing plate positioned on a backlight unit side. As a polarizing plate, a polarizing plate having a configuration in which a polarizer is positioned between two polarizing plate protective films is widely used currently. The polarizing plate included in the liquid crystal display device may be also a polarizing plate having the configuration. Among the two polarizing plate protective films included in the polarizing plate, the polarizing plate protective film positioned on the liquid crystal cell side in a case of being incorporated in the liquid crystal display device is an inner side protective film, and the other polarizing plate protective film is an outer side protective film. In a case of the polarizing plate having a configuration in which the liquid crystal panel includes the front-side polarizing plate, the liquid crystal cell, and the rear polarizer, the rear polarizer is positioned closest to the backlight unit side in the liquid crystal panel, and in a case where the rear polarizer is a polarizing plate having a configuration in which a polarizer is positioned between two polarizing plate protective films, the outer side protective film surface of the rear polarizer becomes the outermost surface of the liquid crystal panel on the backlight unit side.

<<Protective Film>>

(Arithmetic Mean Roughness Ra1 and Pencil Hardness P1)

In the liquid crystal display device, the polarizing plate protective film surface which is the outermost surface of the liquid crystal panel on the backlight unit side has the arithmetic mean roughness Ra1 satisfying Expression 1 (33 nm<Ra1<135 nm) and has the pencil hardness P1 satisfying Expression 3 (P1<P2).

The arithmetic mean roughness Ra1 is more than 33 nm, preferably 40 nm or more, more preferably 47 nm or more, even more preferably 53 nm or more, further even more preferably 60 nm or more, and still further even more preferably 67 nm or more. The arithmetic mean roughness Ra1 is less than 135 nm, preferably 120 nm or less, and more preferably 107 nm or less. The arithmetic mean roughness Ra1 may be adjusted, for example, according to the size and/or the content amount of the component included in the protective film. For example, in a case where the protective film includes a particle, Ra1 may be adjusted according to the average particle diameter and/or the content amount of the particle. For example, as a particle having a larger average particle diameter is used, the arithmetic mean roughness Ra1 tends to increase. According to one aspect, as the content amount of the particle becomes greater, the arithmetic mean roughness Ra1 tends to increase. Details of the preferable particle in view of controlling Ra1 are described below.

In the relationship with P2 of the diffusion member surface which is the outermost surface of the backlight unit on the liquid crystal panel side, the pencil hardness P1 may be smaller than P2 and is not limited to a specific value in terms of the pencil hardness. The hardness difference between P1 and P2 may be one or more stages as the pencil hardness, may be two or more stages, and may be, for example, one to five stages, but the present invention is not limited thereto. Relating to the hardness difference, for example, with respect to HB, H is the hardness higher by one stage, and 2H is the hardness higher by two stages. For example, the pencil hardness P1 may be B, HB, or H but, as described above, is not limited thereto. The pencil hardness P1 may be adjusted according to the types of components included in the protective film. For example, in a case where the protective film includes the particle, pencil hardness P1 may be adjusted according to the types of particles. Details of the preferable particle in view of controlling P1 are described below. The protective film is preferably a resin film, but the pencil hardness P1 may be adjusted according to the types of resins included in the resin film.

With respect to a surface of the protective film which is opposite to the surface which becomes the outermost surface of the liquid crystal panel on the backlight unit side, that is, the surface on the liquid crystal cell side, the arithmetic mean roughness and the pencil hardness measured on this surface are not particularly limited. Ra1 and P1 may be in the range and may be out of the range.

Subsequently, various components that may form the protective film are described.

(Resin)

The protective film is preferably a resin film and may include the resin as the structural component. As the resin included in the resin film, a resin generally used in various optical films such as a polarizing plate protective film may be used without limitation. Specific examples of the resin include an acrylic resin, cellulose acylate, and polyester.

Hereinafter, these resins are described.

—Acrylic Resin—

In a case where the protective film is an acrylic resin film, the acrylic resin film includes an acrylic resin as the film structural component. It is preferable that the acrylic resin has a repeating structural unit derived from a (meth)acrylic acid ester monomer as the repeating structural unit. The expression "(meth)acrylic acid" means acrylic acid and/or methacrylic acid.

The acrylic resin may further include a repeating structural unit obtained by polymerizing at least one selected from a hydroxyl group-containing monomer, an unsaturated carboxylic acid, and a monomer represented by Formula (10) as the repeating structural unit.

$$CH_2=C(X)R^{201} \quad \text{Formula (10)}$$

In Formula (10), $R^{201}$ represents a hydrogen atom or a methyl group, X represents a hydrogen atom, an alkyl group having 1 to 20 carbon atoms, an aryl group, a —CN group, a —CO—$R^{202}$ group, or a —O—CO—$R^{203}$ group, $R^{202}$ and $R^{203}$ each independently represent a hydrogen atom or an organic residue having 1 to 20 carbon atoms.

The (meth)acrylic acid ester monomer is not particularly limited. With respect to the details thereof, paragraph 0034 of JP2013-099875A may be referred to.

The hydroxyl group-containing monomer is not particularly limited. With respect to the details thereof, paragraph 0035 of JP2013-099875A may be referred to.

The unsaturated carboxylic acid is not particularly limited. With respect to the details thereof, paragraph 0036 of JP2013-099875A may be referred to.

With respect to the details of the monomer represented by Formula (10), paragraph 0037 of JP2013-099875A may be referred to.

The acrylic resin may include one or more lactone ring structures. Examples of the one aspect of the lactone ring structure include a lactone ring structure represented by Formula (11).

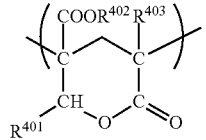

Formula (11)

In Formula (11), $R^{401}$, $R^{402}$, and $R^{403}$ each independently represent a hydrogen atom or an organic residue having 1 to 20 carbon atoms and the organic residue may contain an oxygen atom. Here, examples of the organic residue having 1 to 20 carbon atoms preferably include a methyl group, an ethyl group, an isopropyl group, a n-butyl group, and a t-butyl group.

The content ratio of the lactone ring structure represented by Formula (11) in the structure of the lactone ring-containing acrylic resin is preferably 5 to 90 mass %, more preferably 10 to 70 mass %, even more preferably 10 to 60 mass %, and particularly preferably 10 to 50 mass %.

The method of manufacturing the lactone ring-containing acrylic resin is not particularly limited. The lactone ring-containing acrylic resin may be obtained, for example, by the introduction of a lactone ring structure into polymer (lactone cyclization condensation step) performed by obtaining a polymer (p) having a hydroxyl group and an ester group in a molecular chain by a polymerization step and then performing a heating treatment on the obtained polymer (p). With respect to the details of the preferable physical properties of the lactone ring-containing acrylic resin, paragraphs 0040 to 0047 of JP2012-250535A may be referred to.

With respect to the acrylic resin, paragraphs 0015 to 0093 of JP2012-8248A may be also referred to.

Examples of the acrylic resin include an acrylic resin having a glutarimide structure. With respect to the acrylic resin, paragraphs 0021 to 0037 of JP2013-37057A may be also referred to.

Examples of the acrylic resin include an acrylic resin having a glutaric anhydride unit. With respect to the acrylic resin, paragraphs 0026 to 0050 of JP2009-139720A may be also referred to.

As the acrylic resin, a commercially available product or a product synthesized by the synthesis method well-known in the art.

For example, the acrylic resin film may include an acrylic resin by the content ratio of 30 to 98 mass % and preferably includes an acrylic resin by the content ratio of 50 to 95 mass % with respect to the total mass of the film. The acrylic resin film may be a single layer film or a film having a laminated structure of two or more layers. In the film having a laminated structure of two or more layers, the content ratio of the acrylic resin in each layer may be in the above range. However, according to the calculation of the content ratio of the acrylic resin in the acrylic resin film, in a case where the acrylic resin film includes an acrylic resin particle described below, the acrylic resin included in the acrylic resin particle is excluded in the calculation. In the above acrylic resin film, two or more kinds of acrylic resins may be included. In a case where two or more kinds of acrylic resins are included, the content ratio of the acrylic resin with respect to the total mass of the film may be regulated with respect to the total amount of the two or more kinds of acrylic resins. This point may be applied to various components in the present invention and the present specification in the same manner. That is, a certain component may be used singly or two or more kinds thereof may be used. In a case where two or more kinds are used, the content amount and the content ratio of the corresponding components is regulated by the total amount of the two or more kinds thereof.

—Cellulose Acylate—

In a case where the protective film is the cellulose acylate film, the cellulose acylate film includes cellulose acylate as the film structural component.

Examples of the cellulose acylate include a cellulose acylate compound and a compound having an acyl-substituted cellulose skeleton obtained by biologically or chemically introducing a functional group using cellulose as a raw material. Here, in a case of including a single polymer as a raw material, the "main component" means the polymer, and in a case of including two or more kinds of polymers as raw materials, the "main component" means a polymer of having the highest mass fraction.

Cellulose acylate is ester of cellulose and acid. The acid is preferably organic acid, more preferably carboxylic acid, even more preferably fatty acid having 2 to 22 carbon atoms, and most preferably lower fatty acid having 2 to 4 carbon atoms.

Examples of the raw material cellulose of cellulose acylate include cotton linter and wood pulp (hardwood pulp and softwood pulp), the raw material cellulose may be cellulose acylate obtained from any raw material cellulose or may be used in a mixture, in some cases. For details of the raw material cellulose, for example, "Lecture on Plastic Materials (17) Cellulose Resins" (written by Maruzawa, Uda, et al., The NIKKAN KOGYO SHIMBUN, Ltd., published in 1970) or Japan Institute of Invention and Innovation, Open Technical Report No. 2001-1745 (pages 7 to 8) may be referred to.

Cellulose acylate is obtained by substituting a hydrogen atom of a hydroxyl group of cellulose with an acyl group. The number of carbon atoms in the acyl group is preferably 2 to 22. The acyl group may be an aliphatic acyl group or may be an aromatic acyl group, may be a single substance, or may be substituted with two or more kinds of acyl groups. Examples of the cellulose acylate include alkyl carbonyl ester, alkenyl carbonyl esters, aromatic carbonyl ester, and aromatic alkyl carbonyl ester of cellulose. Each of the alkyl moiety, the alkenyl moiety, the aromatic moiety, and the aromatic alkyl moiety may further have a substituent. Preferable examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, a octadecanoyl group, an i-butanoyl group, a t-butanoyl group, a cyclohexane carbonyl group, an oleoyl group, a benzoyl group, a naphthylcarbonyl group, and a cinnamoyl group. Among these, an acetyl group, a propionyl group, a butanoyl group, a dodecanoyl group, an octadecanoyl group, a t-butanoyl group, an oleoyl group, a benzoyl group, a naphthylcarbonyl group, and a cinnamoyl group are preferable, an acetyl group, a propionyl group, and a butanoyl group are more preferable, and an acetyl group is most preferable.

An acyl substitution degree of cellulose acylate is not particularly limited. In a case where cellulose acylate having an acyl substitution degree of 2.00 to 2.95 is used, it is preferable in view of film formability and various properties of the film to be manufactured. With respect to the acyl substitution degree, the degree of bond of fatty acid such as acetic acid is measured, and the degree of substitution may be obtained by calculation. The measuring may be performed in conformity with ASTM D-817-91.

With respect to the cellulose acylate having at least two kinds of acyl groups of the acetyl group/the propionyl group/the butanoyl group, an acyl substitution degree is preferably 2.50 to 2.95, more preferably 2.60 to 2.95, and even more preferably 2.65 to 2.95.

Cellulose acylate having only an acetyl group, that is, cellulose acetate, the acyl substitution degree is preferably 2.00 to 2.95. The acyl substitution degree is more preferably 2.40 to 2.95 and even more preferably 2.80 to 2.95.

The polymerization degree of the cellulose acylate is not particularly limited, but is preferably 180 to 700 in terms of the viscosity average polymerization degree. With respect to cellulose acetate, the polymerization degree is more preferably 180 to 550, even more preferably 180 to 400, and particularly preferably 180 to 350. It is preferable that the polymerization degree is this upper limit value, because the manufacturing of the film by casting may be easily performed without causing the viscosity of the dope solution of cellulose acylate to be too high. It is preferable that the polymerization degree is the lower limit value or more, because a film having high strength may be manufactured. The viscosity average polymerization degree may be measured by the intrinsic viscosity method of Uta et al. {Uta Kazuo, Saitoh Hideo, (Journal of The Society of Fiber Science and Technology Japan), Vol. 18, No. 1, pages 105 to 120, (1962)}. This method is specifically disclosed in JP1997-95538A (JP-H09-95538A).

The molecular weight distribution of cellulose acylate is evaluated by gel permeation chromatography, and it is preferable that the polydispersity index Mw/Mn (Mw is a weight-average molecular weight, Mn is a number-average molecular weight) is small and the molecular weight distribution is narrow. The specific value of Mw/Mn is preferably 1.0 to 4.0, more preferably 2.0 to 4.0, and even more preferably 2.3 to 3.4.

For example, the cellulose acylate film may include cellulose acylate by the content ratio in the range of 75 to 99 mass % and preferably includes cellulose acylate by the content ratio in the range of 80 to 98 mass % with respect to the total mass of the film. The cellulose acylate film may be a single layer film or a film having a laminated structure of two or more layers. In the film having a laminated structure of two or more layers, the content ratio of the cellulose acylate in each layer may be in the above range.

—Polyester—

In a case where the protective film is the polyester film, the polyester film includes polyester as the film structural component.

Examples of polyester include polyethylene terephthalate, polyethylene isophthalate, polyethylene 2,6-naphthalate, polybutylene terephthalate, and 1,4-cyclohexane dimethylene terephthalate, and two or more types thereof may be used, if necessary. Among these, polyethylene terephthalate is preferable. With respect to polyester, paragraph 0066 of JP2015-106067A may be referred to.

For example, the polyester film may include polyester by the content ratio in the range of 50 to 99 mass %, preferably includes polyester by the content ratio in the range of 70 to 98 mass %, and more preferably includes polyester by the content ratio in the range of 90 to 98 mass % with respect to the total mass of the film. The polyester film may be a single layer film or a film having a laminated structure of two or more layers. In the film having a laminated structure of two or more layers, the content ratio of polyester in each layer may be in the above range.

(Particle in which Average Particle Diameter is in Range of 0.1 to 6.0 μm)

In view of easily adjusting the arithmetic mean roughness Ra1, the protective film preferably includes a particle in which an average particle diameter is in the range of 0.1 to 6.0 μm. The average particle diameter of the particle is preferably in the range of 0.5 to 5.0 μm and more preferably in the range of 1.0 to 3.0 μm. In the particle in which an average particle diameter is in the range of 0.1 to 6.0 μm, as a particle having a greater average particle diameter is used and/or the content amount of this particle is greater, the arithmetic mean roughness Ra1 tends to increase. The corresponding particle may be an inorganic particle or may be an organic particle or may be an organic-inorganic composite particle including an organic component and an inorganic component. Examples of the organic particle include various resin particles. Examples of the inorganic particle include silica particles and zirconia particles.

Preferable examples of the resin particle include acrylic resin particles. Among these, the acrylic resin particle is preferably contained in the acrylic resin film. As the affinity between the acrylic resin particle and the acrylic resin is high, the film durability tends to be improved.

The acrylic resin included as the structural component of the acrylic resin particle may be a homopolymer or may be a copolymer. For example, the acrylic resin particle may include an acrylic-styrene copolymer as the acrylic resin.

As the acrylic resin particle, a crosslinked acrylic resin particle may be used. The "crosslinked acrylic resin particle" refers to a particle at least a portion of an acrylic resin included as a structural component of a particle is a crosslinked acrylic resin. The "crosslinked acrylic resin" is a polymer of a (meth)acrylic acid derivative and a compound having a crosslinking group. The crosslinked acrylic resin particle may be prepared in a well-known method or may be obtained as a commercially available product. With respect to the crosslinked acrylic resin particle, for example, paragraphs 0051 to 0068 of JP2015-127416A may be referred to. Examples of the commercially available product include TECHPOLYMER SSX series, SMX series, and MBX series manufactured by Sekisui Plastics Co., Ltd. and MX series, MR series, SX series, and the like manufactured by Soken Chemical & Engineering Co., Ltd.

The content amount of the particle in which an average particle diameter is in the range of 0.1 to 6.0 μm in the protective film is preferably 5 to 150 parts by mass, more preferably 5 to 100 parts by mass, and even more preferably 20 to 80 parts by mass with respect to 100 parts by mass of the resin included in the film. Here, 100 parts by mass of the resin do not include the content amount of a resin included in a particle in which an average particle diameter is in the range of 0.1 to 6.0 μm or a resin included in a particle used as a brittleness improver described below. Since the crosslinked acrylic resin particle is, generally, a particle having high surface hardness among various particles, there is a tendency in that, as the content ratio of the crosslinked acrylic resin particle increases, the film hardness increases. Therefore, according to one aspect, with respect to the protective film including the crosslinked acrylic resin particle, the pencil hardness P1 may be adjusted by adjusting the content ratio of the crosslinked acrylic resin particle.

(Other Optional Components)

The protective film may include other optional components in an optional amount. Specific examples of the corresponding optional component include well-known plasticizers, ultraviolet absorbing agents, antioxidants, brittleness improvers, and optical enhancers, but the present invention is not limited to these. Examples of the optional components included in the protective film generally include various additives included in various optical films such as a polarizing plate protective film. Examples of the additive include a rubber elastomer particle in which an average particle diameter is in the range of 10 to 300 nm (preferably in the range of 50 to 250 nm). The rubber elastomer particle may be functioned as a brittleness improver in the protective film. The rubber elastomer particle is a particle containing a rubber elastomer (component exhibiting rubber elasticity), may be a particle including a rubber elastomer and may be a particle of a multilayer structure having a rubber elastomer layer. Among these, in a case where the protective film is an acrylic resin film, examples of the rubber elastomer particle that is preferable in view of high affinity with the acrylic resin included in the acrylic resin film include an acrylic rubber elastomer particle. Here, the "acrylic rubber elastomer particle" refers to a rubber elastomer particle in which a component other than the rubber elastomer and/or the rubber elastomer included in this particle is an acrylic resin. The average particle diameter of the rubber elastomer particle is an average primary particle diameter in the same manner as in the average particle diameter of the acrylic resin particle described above, and the measuring method thereof is as described as the method of measuring the average particle diameter of the particle above. For example, in a case where the protective film is the resin film, the rubber elastomer particle may be contained in the protective film in an amount of about 1 to 30 parts by mass, with respect to 100 parts by mass of the total of the resin (here, in a case where a particle in which an average particle diameter is in the range of 0.1 to 6.0 μm is a particle including a resin, the resin included in this particle is excluded) and the rubber elastomer particle included in the film. With respect to the details of the rubber elastomer particle, for example, paragraphs 0037 to 0041 of JP2012-180422A may be referred to.

With respect to the optional component, paragraphs 0072 to 0085 of JP2015-106067A may be also referred to.

(Configuration and Thickness of Film)

The protective film may be a single layer film or a lamination layer film having a laminated structure of two or more layers. In the lamination layer film having a lamination layer structure of two or more layers, adjacent layers preferably come into direct contact with each other without an adhesive layer. It is preferable that the corresponding lamination layer film is manufactured by a solution casting method or a melt casting method described below. According to the present invention and the present specification, the term "adhesive" is used in the same meaning as a layer including an adhesive and a pressure sensitive adhesive.

In a case where the protective film is a lamination layer film, in view of obtaining a film having less curling (warping) as the protective film, it is preferable that the layer included in the lamination layer film is not a cured layer obtained by applying a curable composition to the surface of the substrate film and curing the curable composition. This is because, in the lamination layer film including a cured layer, it is a tendency in that curling is easily generated due to the cure shrinkage of the cured layer. The curable composition refers to a composition including at least one curable compound and the curable compound refers to a compound including one or more polymerizable groups in one molecule. The polymerizable group refers to a group that may perform polymerization reaction.

The thickness (total thickness of lamination layer film) of the protective film, for example, is in the range of 10 to 100 μm, is preferably in the range of 12 to 80 μm, and more preferably in the range of 15 to 60 μm. The thickness may be adjusted by the manufacturing condition in a case of manufacturing the protective film. The thickness of the protective film may be obtained from the manufacturing condition and may be obtained by a well-known film thickness measuring method, for example, a film thickness measuring method with a stylus film thickness gauge. The thickness of the protective film in a case of being measured at a plurality of positions is set as an arithmetic average of measured values at a plurality of positions.

(Manufacturing Method)

The protective film may be manufactured by the well-known film forming method. For example, the protective film may be manufactured by a solution casting method. The solution casting method at least includes a film forming step of preparing a film forming composition (also referred to as a dope or a dope composition), casting and drying this film forming composition onto a support so as to form a film, and peeling this film from a support. A stretching treatment may be performed on the formed film if necessary. Here, the protective film may be manufactured as the single layer film by single layer casting, and the protective film may be manufactured as the lamination layer film, by co-casting a multiple layers of two or more layers. With respect to the details of the manufacturing of the film by the solution casting method, for example, well-known techniques of paragraphs 0034 to 0068 of WO2015/064732A1 may be applied without limitation.

According to another aspect, the protective film may be manufactured by a melt casting method such as an extrusion molding method. With respect to the details of the manufacturing of the film by the melt casting method, for example, well-known techniques of paragraphs 0057 to 0063 of JP2012-180422A and the like may be applied without limitation. For example, the surface roughness of the film to be manufactured may be controlled according to a modulus of elasticity of a pair of rollers (ground rollers) used in the extrusion molding. The protective film can also be manufactured by multilayer extrusion molding.

With respect to the polarizing plate positioned closest to the backlight unit side of the liquid crystal panel that forms the liquid crystal display device, the surface of the protective film positioned closest to the backlight unit side, which becomes the outermost surface on the backlight unit side, has the arithmetic mean roughness Ra1 and the pencil hardness P1 described above. In view of the protection of the polarizer, it is preferable that the polarizing plate having this protective film includes a protective film (the other protective film) also on the opposite side of this protective film. As the other protective film, various films generally used as a polarizing plate protective film may be used without limitations.

Examples of the film to be used as the other protective film include an optical compensation film having an optical compensation layer including an optically anisotropic layer. According to the optical compensation film (also referred to as a phase difference film), in the liquid crystal display device, the characteristics of the angle of view of the screen may be improved. As the optical compensation film, well-known films may be used. In view of widening the angle of view, an optical compensation film disclosed in JP2001-100042A is preferable.

It is preferable that the liquid crystal display device may include two polarizing plates (front-side polarizing plate and rear polarizer). In this case, the polarizing plate having the protective film is a rear polarizer, but the front-side polarizing plate is not particularly limited. With respect to the front-side polarizing plate, well-known techniques relating to the polarizing plate may be applied without limitation.

<Polarizer>

The polarizing plate including the protective film includes a polarizer together with this protective film. The polarizer may be a so-called linear polarizer having a function of converting natural light into specific linearly polarized light. The polarizer is not particularly limited, but an absorptive polarizer may be used. As the absorptive polarizer, a generally used polarizer can be used, for example, all of an iodine-based polarizer, a dye-based polarizer using a dichroic dye, a polyene-based polarizer, and a polarizer using a wire grid may be used. An iodine-based polarizer and a dye-based polarizer may be generally manufactured by causing iodine or a dichroic dye to be adsorbed in a polyvinyl alcohol-based film and stretching the film. Examples of one preferable aspect of the polarizer include an iodine-dyed polyvinyl alcohol-based film. The thickness of the polarizer is not particularly limited but may be, for example, 0.1 μm to 50 μm. In view of thinning the polarizing plate, the thickness of the polarizer is preferably 30 μm or less and more preferably 20 μm or less.

The polarizer may be a so-called coating-type polarizer. With respect to the coating-type polarizer, paragraphs 0052 and 0053 of JP2014-170202A may be referred to.

The polarizer and the protective film may be bonded by a well-known method, for example, by using an adhesive. According to the present invention and the present specification, the term "adhesive" includes a pressure sensitive adhesive as described above. With respect to the adhesive and the bonding of the protective film and polarizer, for example, well-known techniques of paragraphs 0126 to 0135 of JP2012-180422A and the like may be applied without limitation.

<Liquid Crystal Cell>

The liquid crystal panel included in the liquid crystal display element includes a liquid crystal cell together with the polarizing plate described above. The liquid crystal cell may be referred to as a liquid crystal display device. Examples of the liquid crystal cell include a twisted nematic (TN) type, a super-twisted nematic (STN) type, a triple super twisted nematic (TSTN) type, a multi-domain type, a vertical alignment (VA) type, an in plane switching (IPS) type, and an optically compensated bend (OCB) type. The liquid crystal cell generally has a configuration in which a liquid crystal layer is disposed between two glass substrates.

Examples of the liquid crystal cell include an in-cell touch panel liquid crystal cell and an on-cell touch panel liquid crystal cell in which a touch panel function is incorporated in any one of the above liquid crystal cells. Examples thereof also include a form in which a film type touch sensor is bonded to a liquid crystal cell.

The in-cell touch panel liquid crystal cell may be an in-cell touch panel liquid crystal cell which is incorporated with a touch panel function of a resistive film type, a capacitive type, and an optical type inside the liquid crystal cell in which a liquid crystal layer is interposed between two glass substrates. With respect to the in-cell touch panel liquid crystal cell, for example, well-known techniques such as JP2011-76602A and JP2011-222009A may be applied without limitation.

It is preferable that the on-cell touch panel liquid crystal cell may be an on-cell touch panel liquid crystal cell which is incorporated with a touch panel function of a resistive film type, a capacitive type, and an optical type between glass substrates with a liquid crystal layer interposed therebetween and a polarizing plate. The on-cell touch panel liquid crystal cell is disclosed, for example, in JP2012-88683A.

The liquid crystal panel included in the liquid crystal display device at least includes a constituent member (polarizing plate and liquid crystal cell) described above and may optionally include one or more of the other constituent members. As the constituent member, generally, one or more of various members included in the liquid crystal panel may be used.

[Backlight Unit]

The backlight unit included in the liquid crystal display device may be an edge light type backlight unit or may be a direct type backlight unit. A light source and a diffusion member positioned closest to the liquid crystal panel side are at least included in the backlight unit.

<Diffusion Member>

In the diffusion member positioned closest to the liquid crystal panel side of the backlight unit, the surface which becomes the outermost surface of the backlight unit on the liquid crystal panel side has an arithmetic mean roughness Ra2 satisfying Expression 2 (Ra2<15 nm) and has a pencil hardness P2 satisfying Expression 3 (P1<P2).

The arithmetic mean roughness Ra2 is less than 15 nm, preferably 14 nm or less, more preferably 12 nm or less, even more preferably 10 nm or less, further even more preferably 8 nm or less, still further even more preferably 5 nm or less, and even still further even more preferably 3 nm or less. The arithmetic mean roughness Ra2 is preferably 0.5 nm or more and more preferably 1 nm or more. The arithmetic mean roughness Ra2 may be adjusted, for example, according to the size and/or the content amount of the component included in the diffusion member. For example, in a case where the diffusion member includes a particle, Ra2 may be adjusted according to the average particle diameter and/or the content amount of the particle. For example, as a particle having a larger average particle diameter is used, the arithmetic mean roughness Ra2 tends to increase. According to one aspect, as the content amount of the particle becomes greater, the arithmetic mean roughness Ra2 tends to increase.

In the relationship with P1 of the protective film surface which is the outermost surface of the liquid crystal panel on the backlight unit side, the pencil hardness P2 may be greater than P1 and is not limited to a specific value in terms of the pencil hardness. The hardness difference between P1 and P2 may be one or more stages as the pencil hardness, may be two or more stages, and may be, for example, one to five stages, but the present invention is not limited thereto. For example, the pencil hardness P2 may be H, 2H, 3H, or 4H, but is not limited thereto, as described above. The pencil hardness P2 may be adjusted according to the type of the component included in the diffusion member.

With respect to a surface of the diffusion member which is opposite to the surface which becomes an outermost surface of the backlight unit on the liquid crystal panel side, that is, the surface on the light source side, the arithmetic mean roughness and the pencil hardness measured on this surface are not particularly limited. Ra2 and P2 may be in the range and may be out of the range. In a case where the pencil hardness measured on the surface of the diffusion member on the light source side is set as P3, the magnitude relationship of P2 and P3 may be P2<P3, may be P2=P3, and may be P2>P3.

The light diffusibility of the diffusion member is preferably caused by providing the roughness to one or both surfaces of the diffusion member. In this point of view, the surface of the diffusion member on the light source side is preferably a rougher surface than the surface having Ra2 and P2. With respect to the roughness of the surface on the light source side, an arithmetic mean roughness Ra (hereinafter, referred to as "Ra3") is preferably more than 500 nm to 10,000 nm or less and more preferably in the range of 1,000 to 5,000 nm.

As described above, the diffusion member is a member having a haze in the range of 50% to 100%. The haze is preferably in the range of 75% to 98% and more preferably in the range of 80% to 95%. The haze may be adjusted according to the surface roughness of the diffusion member, the size and the content amount of the component included in the diffusion member, and the like.

The diffusion member may be a member having a configuration of a single layer and may be a member in a lamination layer structure. It is preferable that the diffusion member may be a sheet-like member in the lamination layer structure. Hereinafter, as an example, a specific aspect of the diffusion member which is the sheet-like member of the lamination layer structure is described. However, with respect to the diffusion member positioned closest to the liquid crystal panel side of the backlight unit, the outermost surface on the liquid crystal panel side may have Ra2 and P2, but is not limited to the following specific aspects.

(Specific Aspect of Diffusion Member)

The diffusion member which is a sheet-like member of the lamination layer structure is preferably manufactured by forming a layer (diffusion layer) including a particle (light diffusibility particle) that may contribute to the diffusion of light at least one side of the support. In a state of being incorporated with the liquid crystal display device, the diffusion layer may be positioned on the liquid crystal panel side with respect to the support, may be positioned on the light source side, and is preferably positioned on the light source side.

The diffusion layer is preferably a layer including light scattering particles and resins. In view of improvement of adhesiveness with the support, it is preferable that the scattering layer is a cured layer obtained by curing a curable composition including a compound (hereinafter, referred to as a "crosslinking agent") including a crosslinking group in addition to the light scattering particle and the resin.

The crosslinking agent is preferably an isocyanate compound and more preferably a polyfunctional isocyanate compound including two or more isocyanate groups in one molecule. With respect to the polyfunctional isocyanate compound, paragraph 0017 of JP2008-33310A may be referred to.

The resin used in the forming of the diffusion layer is not particularly limited. Specific examples thereof include various resins disclosed in paragraph 0020 of JP2008-33310A. It is preferable to include a resin including a functional group that reacts with an isocyanate group as the resin in the curable composition including an isocyanate compound as a crosslinking agent. With respect to the resin, paragraphs 0018 to 0022 of JP2008-33310A may be referred to. With respect to the resin used in the forming of the diffusion layer, paragraph 0023 of JP2008-33310A may be referred to.

The light diffusibility particle used in the forming of the diffusion layer is a particle having an average particle diameter of preferably 100.0 µm or less and more preferably 25.0 µm or less. The average particle diameter of the light scattering particle used in the forming of the diffusion layer is, for example, 1.0 µm or more. The method of measuring the average particle diameter described herein is as described above. With respect to the light diffusibility particle, paragraph 0024 of JP2008-33310A may be referred to. For example, an arithmetic mean roughness measured on the surface on the side having the diffusion layer may be adjusted by adjusting an average particle diameter and/or a content amount of the light scattering particle included in the diffusion layer in the diffusion member.

With respect to the method of preparing the curable composition for forming the diffusion layer and content amounts of various components in this curable composition or the diffusion layer, paragraphs 0024 to 0028 of JP2008-33310A may be referred to. With respect to a method of forming the diffusion layer by using the curable composition and details of an undercoat layer and a back layer which are optionally provided, paragraphs 0031 to 0038 of JP2008-33310A may be referred to.

The curable composition may include scattering agents disclosed in paragraph 0029 of JP2008-33310A and a solvent of paragraph 0030 of JP2008-33310A.

With respect to the support, paragraph 0039 of JP2008-33310A may be referred to. With respect to the support, paragraphs 0013 to 0015 of JP2009-199002A may be also referred to.

For example, the diffusion member which is the sheet-like member may be obtained by forming one or more easily adhesive layers on one or both surfaces of the support, if necessary, and forming a diffusion layer on at least one surface side. The diffusion layer is as described above. With respect to the easily adhesive layer, paragraphs 0016 to 0030 of JP2009-199002A may be also referred to.

According to one aspect, the diffusion member has a diffusion layer on one side, preferably on the light source side of the support in a state of being incorporated with the liquid crystal display device, and preferably has a cured layer obtained by curing the curable composition on the other side, preferably on the liquid crystal panel side. The fact that this cured layer is a cured layer generally called a hardcoat layer is preferable for obtaining a diffusion member having the pencil hardness P2 satisfying Expression 3.

With respect to the curable composition for forming a cured layer to be formed preferably on the liquid crystal panel side, disclosure relating the composition for forming hardcoat layers disclosed in paragraphs 0087 to 0112 of JP2014-167659A. For example, according to the average particle diameter and/or the content amount of the particle included in the cured layer formed from the corresponding curable composition, the arithmetic mean roughness Ra2 of the surface on the liquid crystal panel side of the diffusion member may be controlled. For example, the average particle diameter measured by the aforementioned method of the particle included in the cured layer may be in the range of 0.1 to 10.0 µm and preferably in the range of 0.2 to 3.0 µm. With respect to the total amount of 100 parts by mass of the curable compound included in the curable composition, it is preferable to include 0 to 50 parts by mass of the particle. The cured layer may include a crosslinked acrylic resin particle. The hardness of the cured layer may be adjusted according to the types or mixing ratio of curable compounds included in the curable composition. According to one aspect, accordingly, it is possible to control the pencil hardness P2 of the surface of the diffusion member on the liquid crystal panel side.

According to one aspect, the thickness of the support may be in the range of 10 to 500 µm, the thickness of the diffusion layer may be in the range of 3 to 50 µm, and the thickness of the cured layer may be in the range of 1 to 20 µm.

In the above, the specific aspect of the diffusion member positioned closest to the liquid crystal panel side in the backlight unit of the liquid crystal display device is described. However, the present invention is not limited to the corresponding specific aspect.

<Light Source>

As the light source included in the backlight unit of the liquid crystal display device, various light sources included in a general backlight unit starting from a white light source may be used without limitation.

<Members Included in Backlight Unit>

(Light Collecting Member)

The backlight unit of the liquid crystal display device may optionally include and preferably includes one or more members in addition to the light source and the diffusion member described above. Examples of the member preferably include a light collecting member. In view of the further improvement of the brightness, it is more preferable that the light collecting member and the diffusion member are disposed in this order from the light source side toward the liquid crystal panel side in the backlight unit of the liquid crystal display device.

As the light collecting member, various members generally used as a light collecting sheet such as a prism sheet, a lens sheet, and the like may be used. According to one aspect, the light collecting member may have a plurality of protrusions on the liquid crystal panel side, that is, on the emitting side surface in a state of being incorporated into the liquid crystal display device. Specific examples of the surface shape of the emitting side surface include an uneven shape formed by two-dimensionally disposing a shape selected from the group consisting of a polygonal pyramidal shape, a conical shape, a partial spheroidal shape, and a partial spherical shape. According to another aspect, examples thereof include an uneven shape formed by one-dimensionally disposing a shape selected from the group consisting of a partial cylindrical shape, a partial elliptic cylinder shape, and a prismatic shape.

Here, the expression "polygonal pyramidal shape" has the meaning of including not only a complete polygonal pyramid shape but also a shape similar to a polygonal pyramid. The same is applied to the other shapes.

The expression "one-dimensionally disposing" means that the shape is disposed only in one direction of the emitting side surface of the light collecting member, that is, in parallel. Such an uneven shape may be referred to as a line and space pattern. With respect to the light collecting member having a one-dimensionally disposed uneven shape, it is preferable that two light collecting members are laminated such that the line and space patterns of the both light collecting members are orthogonal to each other. The light collecting effect may be increased accordingly.

Otherwise, the expression "two-dimensionally disposing" means that the shapes are disposed in two or more directions of the emitting side surface of the light collecting member. For example, the present invention is not limited to an aspect of being formed in two directions of a certain direction and a direction orthogonal to this direction or an aspect of being regularly formed, and an aspect of being randomly formed is included.

According to the present invention and the present specification, an angle and the relationship thereof (for example, "orthogonal" and "parallel") include a range of errors acceptable in the technical field to which the present invention belongs. For example, the angle means an angle in a range of less than ±10° of an exact angle, and an error with respect to the exact angle is preferably 5° or less, and is more preferably 3° or less.

(Other Diffusion Members)

The backlight unit of the liquid crystal display device may optionally include and preferably includes other diffusion members in addition to the diffusion member positioned closest to the liquid crystal panel side. As the other diffusion member, a commercially available diffusion sheet or a diffusion sheet manufactured by a well-known method, or the like may be used without limitation. It is more preferable that other diffusion members, the light collecting member, and the diffusion member positioned closest to the liquid crystal panel side are disposed in this order from the light source side toward the liquid crystal panel side in the backlight unit of the liquid crystal display device.

In addition to the above, one or more members such as a reflection plate and a light guide plate which are generally included in the backlight unit may be included in the backlight unit of the liquid crystal display device.

The liquid crystal display device according to the present invention may achieve the improvement of the brightness and the improvement of the display performance by including the liquid crystal panel and the backlight unit described above. Specifically, the liquid crystal display device according to the present invention may improve the brightness, suppress the generation of the light leak on the display surface, and suppress the generation of the display unevenness (Newton ring).

EXAMPLES

Hereinafter, the present invention is specifically described with reference to the examples. A material, a reagent, a substance quantity, a ratio thereof, an operation, and the like provided in the following examples can be suitably changed without departing from the gist of the present invention. Accordingly, the scope of the present invention is not limited to the following specific examples. "%" in the description below is based on mass. The solid content refers to a component excluding a solvent.

[Particle Used in Preparation of Dope Composition]

Particles added to a dope composition prepared in order to manufacture the protective film (acrylic resin film) in the examples and the comparative examples were particles disclosed in Table 1. The particle was formed as a solvent dispersion sol, and an average particle diameter was calculated as a 50% average particle diameter in this sol by using Nanotrac particle size analyzer manufactured by Nikkiso Co., Ltd.

Particles 1 to 3 are crosslinked acrylic resin particles including a polymethylmethacrylate resin (Polymethyl methacrylate: PMMA) as an acrylic resin forming a particle.

TABLE 1

| | Particle | Average particle diameter [μm] |
|---|---|---|
| Particle 1 | Crosslinked acrylic resin particle (TECHPOLYMER SSX-101 manufactured by Sekisui Plastics Co., Ltd.) | 1.0 |
| Particle 2 | Crosslinked acrylic resin particle (TECHPOLYMER SSX-102 manufactured by Sekisui Plastics Co., Ltd.) | 2.0 |
| Particle 3 | Crosslinked acrylic resin particle (TECHPOLYMER SSX-103 manufactured by Sekisui Plastics Co., Ltd.) | 3.0 |

[Acrylic Resin Used in Preparation of Dope Composition]

Details of acrylic resins 1 to 4 added to the dope composition prepared in order to manufacture the protective film (acrylic resin film) in the examples and the comparative examples were as follows.

<Acrylic Resin 1>

As the brittleness improver for preparing the acrylic resin 1, an acrylic rubber elastomer particle in a three-layer structure consisting of an innermost layer which was a full hard polymer polymerized with methyl methacrylate using a small amount of allyl methacrylate, an interlayer which was a soft rubber elastomer polymerized with butyl acrylate as a main component and further using styrene and a small amount of allyl methacrylate, and an outermost layer which was a full hard polymer polymerized with methyl methacrylate using a small amount of ethyl acrylate was obtained by synthesis by the well-known method. The particle was formed as a solvent dispersion sol, and an average particle diameter of the obtained acrylic rubber elastomer particle was calculated as a 50% average particle diameter in this sol by using Nanotrac particle size analyzer manufactured by Nikkiso Co., Ltd. and was 240 nm.

70 parts by mass of pellets of a copolymer of methyl methacrylate/methyl acrylate at a mass ratio of 96/4 were mixed with 30 parts by mass of the above brittleness improver by a mixer and melt-kneaded by a twin-screw extruder, so as to obtain the acrylic resin 1.

<Acrylic Resin 2>

The acrylic resin 2 containing a lactone ring structure was obtained by a method disclosed in paragraph 0154 of JP2012-008248A.

<Acrylic Resin 3>

100 parts by mass of an imidized MS (methyl methacrylate-styrene) resin disclosed in Manufacturing Example 1 of JP2010-284840A and 0.62 parts by mass of a triazine-based ultraviolet absorbing agent (T-712 manufactured by ADEKA Corporation) were mixed at 220° C. in a biaxial kneader, so as to obtain the acrylic resin 3 having a glutarimide structure.

<Acrylic Resin 4>

The acrylic resin 4 having a glutaric anhydride unit was obtained by the method disclosed in paragraph 0177 of JP2009-139720A.

[Manufacturing of Protective Film (Acrylic Resin Film)]

The composition described below was put into a mixing tank and stirred while heating, and respective components were dissolved, so as to prepare a dope composition.

(Dope Composition)

| | |
|---|---|
| Acrylic resin disclosed in Table 2 | 100 parts by mass |
| Dichloromethane | 534 parts by mass |
| Methanol | 46 parts by mass |
| Particle disclosed in Table 2 | See Table 2 |

The dope composition was evenly cast from a casting die to a stainless steel endless band (casting support) in having a width of 2,000 mm by using a band casting device having a configuration illustrated in FIG. 1 of WO2015/064732A1. A film was peeled off from the casting support in a case where an amount of a retained solvent in the dope composition became 20 mass %.

The peeled film was dried for 30 minutes in a drying zone (atmosphere temperature 140° C.) so as to obtain an acrylic resin film (protective film) disclosed in Table 2. The thickness of the acrylic resin film was a value obtained from the manufacturing condition and was adjusted to be 40 μm according to the amount of the dope composition used in the film formation.

(First Layer Coating Solution X for Easily Adhesive Layer)

| | |
|---|---|
| Polyester resin (PLASCOAT Z-687 manufactured by Goo Chemical Co., Ltd., solid content 25%) | 45.1 parts by mass |
| Compound having a plurality of carbodiimide structures (CARBODILITE V-02-L2 manufactured by Nisshinbo Holdings Inc., solid content 40%) | 15.8 parts by mass |
| Oxazoline compound (EPOCROS K2020E manufactured by Nippon Shokubai Co., Ltd., solid content 40%) | 7.0 parts by mass |

TABLE 2

| | | Particle | | | |
|---|---|---|---|---|---|
| | Type | | Average particle diameter [μm] | Addition amount [parts by mass] | Acrylic resin |
| Protective film 1 | Crosslinked acrylic resin particle | Particle 1 | 1.0 | 50 | Acrylic resin 1 |
| Protective film 2 | Crosslinked acrylic resin particle | Particle 2 | 2.0 | 1 | Acrylic resin 1 |
| Protective film 3 | Crosslinked acrylic resin particle | Particle 2 | 2.0 | 50 | Acrylic resin 1 |
| Protective film 4 | Crosslinked acrylic resin particle | Particle 3 | 3.0 | 1 | Acrylic resin 1 |
| Protective film 5 | Crosslinked acrylic resin particle | Particle 1 | 1.0 | 40 | Acrylic resin 1 |
| Protective film 6 | Crosslinked acrylic resin particle | Particle 1 | 1.0 | 25 | Acrylic resin 1 |
| Protective film 7 | No particle | — | — | — | Acrylic resin 1 |
| Protective film 8 | Crosslinked acrylic resin particle | Particle 3 | 3.0 | 2 | Acrylic resin 1 |
| Protective film 9 | Crosslinked acrylic resin particle | Particle 1 | 1.0 | 1 | Acrylic resin 1 |
| Protective film 10 | Crosslinked acrylic resin particle | Particle 1 | 1.0 | 50 | Acrylic resin 2 |
| Protective film 11 | Crosslinked acrylic resin particle | Particle 1 | 1.0 | 50 | Acrylic resin 3 |
| Protective film 12 | Crosslinked acrylic resin particle | Particle 1 | 1.0 | 50 | Acrylic resin 4 |

[Manufacturing of Diffusion Sheet]
<Support>

A polyethylene terephthalate (hereinafter referred to as "PET") resin having an intrinsic viscosity of 0.66 obtained by polycondensation of a germanium (Ge) compound as a catalyst was dried to a moisture content of 50 ppm or less and was melted in an extruder having a heater set temperature of 280° C. to 300° C. The molten PET resin was discharged from the die portion to a chill roller (cooling roller) electrostatically applied, to obtain a film. The obtained film was stretched 3.1 times in the longitudinal direction (direction which is an extruding direction in the extruder) and stretched 3.8 times in the width direction, so as to obtain a PET support having a thickness of 188 μm.

<Easily Adhesive Layer>

A corona discharge treatment was performed on both surfaces of the PET support, and each surface of the PET support was coated with a first layer coating solution X for an easily adhesive layer having the following composition by a bar coating method. The coating amount was set as 7.1 cm³/m², and the solution was dried for one minute under the environment of an atmosphere temperature of 185° C. Accordingly, the first layer of the easily adhesive layer was formed.

-continued

| | |
|---|---|
| Anionic surfactant A (1% aqueous solution of RAPISOL B-90 manufactured by NOF Corporation) | 12.7 parts by mass |
| Nonionic surfactant B (1% aqueous solution of NAROACTY CL-95 manufactured by Sanyo Chemical Industries, Ltd.) | 15.5 parts by mass |
| Distilled water | Added such that the entire became 1,000 parts by mass |

After a corona discharge treatment was performed on the surface of the first layer of the formed easily adhesive layer, a second layer coating solution Y was for an easily adhesive layer in the following composition was applied by a bar coating method. The coating amount was set as 7.1 cm³/m², and drying was performed under the circumstances of the atmosphere temperature of 165° C. for one minute. Accordingly, the second layer of the easily adhesive layer was formed on both surfaces of the support.

(Second Layer Coating Solution Y for Easily Adhesive Layer)

| | |
|---|---|
| Polyurethane resin (OLESTER UD-350, manufactured by Mitsui Chemicals, Inc., solid content 38%) | 22.8 parts by mass |
| Acrylic resin (EM48D manufactured by Daicel Corporation, solid content 27.5%) | 2.6 parts by mass |
| Compound having a plurality of carbodiimide structures (CARBODILITE V-02-L2 manufactured by Nisshinbo Holdings Inc., solid content 40%) | 4.7 parts by mass |
| Anionic surfactant A (1% aqueous solution of RAPISOL B-90 manufactured by NOF Corporation) | 12.7 parts by mass |
| Nonionic surfactant B (1% aqueous solution of NAROACTY CL-95 manufactured by Sanyo Chemical Industries, Ltd.) | 15.5 parts by mass |
| Silica particle dispersion (Aqueous dispersion of AEROSIL OX-50 manufactured by Nippon Aerosil Co., Ltd., solid content 10%) | 1.6 parts by mass |
| Colloidal silica (SNOWTEX XL manufactured by Nissan Chemical Industries, solid content 40.5%) | 3.5 parts by mass |
| Lubricant (Carnauba wax dispersion SELOSOL 524 manufactured by Chukyo Yushi Co., Ltd., solid content 30%) | 1.6 parts by mass |
| Distilled water | Added such that the entire became 1,000 parts by mass |

<Cured Layer (Formed on Side that Became Liquid Crystal Panel Side in Liquid Crystal Display Device)>

After an easily adhesive layer was formed on both surfaces of the PET support as described above, one surface (hereinafter, described as a "surface A") was coated with a curable composition 1, the composition was dried for 60 seconds under the environment of the atmosphere temperature of 100° C. and was irradiated with ultraviolet rays under the condition of 0.1% or less of nitrogen, so as to be cured (irradiation condition: 1.5 kW, 300 mJ), and thus a cured layer having a thickness of 5 μm was formed. The adjusting of the thickness was performed by adjusting the coating amount in the die coating method using a slot die.

(Preparing of Curable Composition 1)

The mixture obtained by mixing the following components was filtrated through a polypropylene filter having a pore size of 30 μm so as to prepare the curable composition 1. Details of the components indicating the product names are described below.

| | |
|---|---|
| Curable compound 1 (PET-30, solid content 100%) | See Table 3 |
| Curable compound 2 (VISCOAT 360 (solid content 100%)) | See Table 3 |
| IRGACURE 127 (solid content 100%) | 3.2 parts by mass |
| CAB polymer (solid content 20%) | 7.0 parts by mass |
| Leveling agent (SP-13 (solid content 5%)) | 2.3 parts by mass |
| Methyl isobutyl ketone (MIBK) | 60.0 parts by mass |
| Methyl ethyl ketone (MEK) | 26.0 parts by mass |

(Preparing of Curable Compositions 2, 3, and 6)

The curable compositions 2, 3, and 6 were prepared in the same manner as in the curable composition 1, except for changing content amounts of the curable compounds 1 and 2 to values presented in Table 3. The curable compound 1 was a so-called high hardness crosslinking material, the curable compound 2 was a crosslinking material including an ethylene bond between a crosslinking point and a crosslinking point and was a compound having a longer molecular chain length than the curable compound 1. The hardness of the formed cured layer may be adjusted by changing a mixing ratio of these two kinds of curable compounds.

(Preparation of Curable Compositions 4, 5, and 7)

The mixture obtained by mixing the following components was filtrated through a polypropylene filter having a pore size of 30 μm so as to prepare the curable compositions 4, 5, and 7. Details of the components indicating the product names are described below.

| | |
|---|---|
| Curable compound 1 (PET-30, (solid content 100%)) | See Table 3 |
| Curable compound 2 (VISCOAT 360 (solid content 100%)) | See Table 3 |
| IRGACURE 127 (solid content 100%) | 3.2 parts by mass |
| Crosslinked acrylic resin particle ("Particle 1" in Table 1) | See Table 3 |
| CAB polymer (solid content 20%) | 7.0 parts by mass |
| Leveling agent (SP-13 (solid content 5%)) | 2.3 parts by mass |
| MIBK | 60.0 parts by mass |
| MEK | 26.0 parts by mass |

Details of components used in the preparation of the curable composition are provided below.

PET-30: Mixture of Pentaerythritol triacrylate and pentaerythritol tetraacrylate (manufactured by Nippon Kayaku Co., Ltd.)

VISCOAT 360: Ethylene oxide modified trimethylolpropane triacrylate (manufactured by Osaka Organic Chemical Industry Co., Ltd.)

CAB polymer: Cellulose acetate butyrate (solid content 20%) (MIBK solution of 531-1 manufactured by Eastman Chemical Company)

IRGACURE 127: Polymerization initiator (manufactured by BASF SE)

SP-13: 5% MEK solution of the following fluoropolymer, Mw below was a weight-average molecular weight

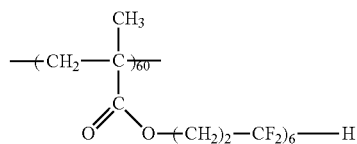

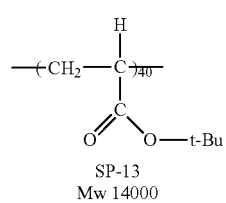

SP-13
Mw 14000

TABLE 3

| | Curable compound 1 Content amount [parts by mass] | Curable compound 2 Content amount [parts by mass] | Crosslinked acrylic resin particle | | |
|---|---|---|---|---|---|
| | | | Type | Average particle diameter [μm] | Content amount [parts by mass] |
| Curable composition 1 | 96.0 | 0 | No Particle | — | — |
| Curable composition 2 | 64.0 | 32.0 | No Particle | — | — |
| Curable composition 3 | 32.0 | 64.0 | No Particle | — | — |
| Curable composition 4 | 91.0 | 0 | Particle 1 | 1.0 | 5.0 |
| Curable composition 5 | 88.0 | 0 | Particle 1 | 1.0 | 8.0 |
| Curable composition 6 | 0 | 96.0 | No Particle | — | — |
| Curable composition 7 | 86.0 | 0 | Particle 1 | 1.0 | 10.0 |

<Diffusion Layer (Formed on Side that Became Light Source Side in Liquid Crystal Display Device)>

Next, a diffusion layer was formed on a surface (hereinafter referred to as a "surface B") opposite to the surface A of the PET support by the following method.

A coating solution and a crosslinking agent solution having the following composition were sent by a pump. At that point, while the solutions were sent such that the flow rate of the coating solution was set as 100 g and the flow rate of the crosslinking agent liquid was set as 9.98 g, both were mixed in a static mixer (φ3.4-N60S-523-F, manufactured by Noritake Co., Limited). After three minutes from mixing, the second layer of the easily adhesive layer was coated with the obtained mixed solution such that the coating amount became 64.4 cm³/m², and the solution was dried for two minutes under the environment of an atmosphere temperature of 120° C. so as to form a diffusion layer.

(Coating Solution)

| | |
|---|---|
| Methyl ethyl ketone | 1,130 parts by mass |
| Acrylic resin (ACRYDIC A811BE, manufactured by DIC Corporation, 50 mass % solution, hydroxyl number 17, acid value 3) | 501.6 parts by mass |

-continued

| | |
|---|---|
| JURYMER MB-20X (Polymethyl methacrylate cross-linked type organic particles, spherical particles having an average particle diameter of 18 μm, manufactured by Nippon Junyaku Co., Ltd.) | 421.3 parts by mass |
| F780F (30% solution of methyl ethyl ketone manufactured by DIC Corporation) | 0.97 parts by mass |

(Crosslinking agent solution)

| | |
|---|---|
| Methyl ethyl ketone | 1,039 parts by mass |
| Isocyanate compound (TAKENATE D110N manufactured by Mitsui Chemicals Inc.) | 352 parts by mass |

The diffusion sheets 1 to 7 were manufactured as above. A diffusion sheet 8 was manufactured by forming a layer formed on the surface A of the diffusion sheet 1 on the surface B and forming a layer formed on the surface B of the diffusion sheet 1 on the surface A. Layers formed on the surfaces A and B of each diffusion sheet are presented in Table 4.

A measurement sample (size: 40 mm×80 mm) was cut from the manufactured diffusion sheet, a haze of this measurement sample was measured by the method described above by using HGM-2DP manufactured by Suga Test Instruments Co., Ltd. as a haze meter. The measurement results are presented in Table 4.

TABLE 4

| | Layer formed on surface A (on liquid crystal panel side) | Layer formed on surface B (on light source side) | Haze (%) |
|---|---|---|---|
| Diffusion Sheet 1 | Cured layer obtained by curing curable composition 1 | Diffusion layer | 88 |
| Diffusion Sheet 2 | Cured layer obtained by curing curable composition 2 | Diffusion layer | 88 |
| Diffusion Sheet 3 | Cured layer obtained by curing curable composition 3 | Diffusion layer | 88 |
| Diffusion Sheet 4 | Cured layer obtained by curing curable composition 4 | Diffusion layer | 90 |
| Diffusion Sheet 5 | Cured layer obtained by curing curable composition 5 | Diffusion layer | 92 |
| Diffusion Sheet 6 | Cured layer obtained by curing curable composition 6 | Diffusion layer | 88 |
| Diffusion Sheet 7 | Cured layer obtained by curing curable composition 7 | Diffusion layer | 93 |
| Diffusion Sheet 8 | Diffusion layer | Cured layer obtained by curing curable composition 1 | 88 |

For each example and comparative example, protective films and polarizing plates for various evaluations were manufactured by the method described above to manufacture a protective film to be used in a liquid crystal display device. For each example and comparative example, diffusion sheets to be used in diffusion sheets and liquid crystal display devices for various evaluations were manufactured.

[Polarizing Plates of Examples and Comparative Examples]

<Manufacturing of Polarizer>

According to Example 1 of JP2001-141926A, a stretched polyvinyl alcohol-based film was adsorbed with iodine so as to manufacture a polarizer (iodine-dyed polyvinyl alcohol-based film) having a thickness of 7 μm.

<Manufacturing of Polarizing Plate (Bonding of Polarizer and Protective Film)>

A polarizer manufactured as described above used an acrylic resin film of each of the examples and the comparative examples as one protective film, both were bonded to each other by using one surface of this film via an adhesive. As the other protective film, a saponification treatment was performed on a commercially available cellulose acylate film (FUJITAC (registered trademark) ZRD40 manufactured by Fujifilm Corporation), and bonding was performed using the surface subjected to the saponification treatment as a bonding surface via an adhesive. The saponification treatment was performed as below. The cellulose acylate film was immersed for two minutes in a 1.5 mol/L NaOH aqueous solution (saponification solution) of which the liquid temperature was kept at 55° C., and the film was rinsed with water. Thereafter, the film was immersed in a 0.05 mol/L sulfuric acid aqueous solution at a liquid temperature of 25° C. for 30 seconds and then was passed under running water for 30 seconds so as to cause the film to be in a neutral state. Then, after the drainage by the air knife was repeated three times so as to drop the water, the film was retained for 15 seconds in the drying zone at the atmosphere temperature 70° C. so as to be dried, and thus a saponification treated film was obtained.

For each example and comparative example, polarizing plates for various evaluations and polarizing plates for manufacturing a liquid crystal display device were manufactured by the method described above.

[Liquid Crystal Display Devices of Examples and Comparative Examples]

The backlight unit side polarizing plate (rear polarizer) among the two polarizing plates with a liquid crystal cell interposed therebetween was peeled off from a commercially available liquid crystal television (slim 42 type liquid crystal television in IPS mode), and the polarizing plate of each of the examples and the comparative examples was re-bonded to the liquid crystal cell via an adhesive such that the acrylic resin film was disposed on the backlight unit side. The sheet-like member positioned closest to the liquid crystal panel side among the backlight units mounted on the commercially available liquid crystal television was removed and the diffusion sheet manufactured as above was disposed such that a layer formed on the surface A was positioned on the liquid crystal panel side, that is, the layer formed on the surface B is positioned on the light source side. The configuration of the liquid crystal television at this point in an order of the table from the light source side was (1) a light guide plate in which a light source was disposed on a side surface/(2) a diffusion plate/(3) a light collecting sheet (prism sheet)/(4) a diffusion sheet manufactured above/(5) a rear polarizer in which the polarizing plate (acrylic resin film manufactured above was disposed on a backlight unit side/(6) a liquid crystal cell/(7) a front-side polarizing plate. Therefore, the outer side protective film of the rear polarizer was the protective film (acrylic resin film) manufactured above. Except for the various members manufactured above, members incorporated in the commercially available liquid crystal television were used.

In this manner, liquid crystal display devices of the examples and the comparative examples were manufactured.

[Method of Evaluating Protective Film (Acrylic Resin Film) and Diffusion Sheet]

<Arithmetic Mean Roughness Ra>

The arithmetic mean roughness Ra1 was measured on the surface that became a surface positioned closest to the backlight unit side in the liquid crystal display device of the acrylic resin film used as the protective film in the examples and the comparative examples. The measured Rat is presented in Table 5. The measurement of Ra was performed by the method described above and using a scanning-type probe microscope (SPA400 manufactured by SII NanoTechnology Inc.) in an AFM mode as AFM.

With respect to the diffusion sheets used in the examples and the comparative examples, on the surface of the layer formed on the surface A and the surface of the layer formed on the surface B, the arithmetic mean roughness Ra was measured. Ra measured on the surface of the layer formed on the surface A is presented as Ra2 in Table 5, and Ra measured on the surface of the layer formed on the surface B is presented as Ra3 in Table 6.

<Pencil Hardness>

The pencil hardness P1 was measured by the method described above on the surface that became a surface positioned closest to the backlight unit side in the liquid crystal display device of the acrylic resin film used as the protective film in the examples and the comparative examples. The measured P1 was presented in Table 5.

The pencil hardness was measured by the method described above on the surface of the layer formed on the surface A and the surface of the layer formed on the surface B in the diffusion sheets used in the examples and the comparative examples. The pencil hardness measured on the surface of the layer formed on the surface A is presented as P2 in Table 5, and the pencil hardness measured on the surface of the layer formed on the surface B is presented as P3 in Table 6.

[Method of Evaluating Liquid Crystal Display Device]

<Evaluation 1 (Evaluation of Light Leak) of Display Performance>

Vibration was applied to the liquid crystal display device of each of the examples and the comparative examples, a lighting test was performed, and the presence and absence of the light leak on the display surface were visually evaluated. Specifically, the vibration periodically changing in a gravitational acceleration of 1.5 G (1.0 G is 9.80665 m/s$^2$), an amplitude of 0.8 mm, a frequency of 10 to 40 Hz was applied in the x direction, the y direction, and the z direction for 20 minutes, by using a packing and packaging tester (BF-50UT, manufactured by AIMEX Co., Ltd.) as a testing machine. The lighting test was performed after the vibration was applied.

The above evaluations were performed on each of the examples and the comparative examples, so as to confirm whether the light leak occurs. After the confirmation, the polarizing plate was changed to a new polarizing plate, and the same evaluation was performed 30 times in total. The display performance was evaluated in the following standards. A to C were preferable in practice.

A: The light leak was not recognized all of 30 times out of 30 times.

B: A: The light leak was recognized one time out of 30 times.

C: The light leak was recognized two times out of 30 times.

The above evaluation results are provided in Table 5. From the results presented in Table 5, it was confirmed that the improvement of the brightness and the improvement (suppressing of the light leak and the display unevenness) of the display performance were achieved in the liquid crystal display devices of the examples, compared with the liquid crystal display devices of the comparative examples.

TABLE 5

|  | Protective film (Outer side protective film on rear polarizer) | Diffusion sheet | Liquid crystal panel side Ra1 | | Backlight unit side Ra2 | | Evaluation result | | |
|---|---|---|---|---|---|---|---|---|---|
|  |  |  |  | P1 |  | P2 | Display performance 1 (light leak) | Display performance 2 (display unevenness) | Brightness |
| Example 1 | Protective film 1 | Diffusion sheet 1 | 53 nm | HB | 2 nm | 3H | A | A | A |
| Example 2 | Protective film 2 | Diffusion sheet 1 | 67 nm | HB | 2 nm | 3H | A | A | A |
| Example 3 | Protective film 3 | Diffusion sheet 1 | 100 nm | HB | 2 nm | 3H | A | A | B |
| Example 4 | Protective film 4 | Diffusion sheet 1 | 127 nm | HB | 2 nm | 3H | A | A | C |
| Example 5 | Protective film 5 | Diffusion sheet 1 | 47 nm | HB | 2 nm | 3H | A | B | A |
| Example 6 | Protective film 6 | Diffusion sheet 1 | 40 nm | HB | 2 nm | 3H | A | C | A |
| Example 7 | Protective film 1 | Diffusion sheet 2 | 53 nm | HB | 2 nm | 2H | B | A | A |
| Example 8 | Protective film 2 | Diffusion sheet 2 | 67 nm | HB | 2 nm | 2H | B | A | A |
| Example 9 | Protective film 1 | Diffusion sheet 3 | 53 nm | HB | 2 nm | H | C | A | A |
| Example 10 | Protective film 2 | Diffusion sheet 3 | 67 nm | HB | 2 nm | H | C | A | A |
| Example 11 | Protective film 1 | Diffusion sheet 4 | 53 nm | HB | 10 nm | 3H | B | A | A |
| Example 12 | Protective film 2 | Diffusion sheet 5 | 67 nm | HB | 14 nm | 3H | C | A | A |
| Example 13 | Protective film 10 | Diffusion sheet 1 | 53 nm | HB | 2 nm | 3H | A | A | A |
| Example 14 | Protective film 11 | Diffusion sheet 1 | 53 nm | HB | 2 nm | 3H | A | A | A |
| Example 15 | Protective film 12 | Diffusion sheet 1 | 53 nm | HB | 2 nm | 3H | A | A | A |
| Comparative Example 1 | Protective film 7 | Diffusion sheet 8 | 2 nm | HB | 1,700 nm | H | D | A | A |
| Comparative Example 2 | Protective film 8 | Diffusion sheet 1 | 135 nm | HB | 2 nm | 3H | A | A | D |
| Comparative Example 3 | Protective film 9 | Diffusion sheet 1 | 33 nm | HB | 2 nm | 3H | A | D | A |
| Comparative Example 4 | Protective film 1 | Diffusion sheet 6 | 53 nm | HB | 2 nm | HB | D | A | A |
| Comparative Example 5 | Protective film 2 | Diffusion sheet 6 | 67 nm | HB | 2 nm | HB | D | A | A |
| Comparative Example 6 | Protective film 1 | Diffusion sheet 7 | 53 nm | HB | 16 nm | 3H | D | A | A |
| Comparative Example 7 | Protective film 2 | Diffusson sheet 7 | 67 nm | HB | 16 nm | 3H | D | A | A |

D: The light leak was recognized three or more times out of 30 times.

<Evaluation 2 (Evaluation of Display Unevenness) of Display Performance>

The lighting test was performed on the liquid crystal display device of the examples and the comparative examples, and presence and absence of display unevenness were confirmed. The display performance was evaluated in the following standards. A to C were preferable in practice.

A: Newton ring was not recognized in all distances of 30 cm, 60 cm, and 90 cm from the display surface.

B: Newton ring was recognized in the distance of 30 cm from the display surface, but Newton ring was not recognized in 60 cm and 90 cm.

C: Newton ring was recognized in the distances of 30 cm and 60 cm from the display surface, but Newton ring was not recognized in 90 cm.

D: Newton ring was recognized in the distances of 30 cm, 60 cm, and 90 cm from the display surface.

<Evaluation of Brightness>

The lighting test was performed on the liquid crystal display device of the examples and the comparative examples, the brightness was evaluated on the front surface of the display surface, and the brightness was evaluated in the following standards. A to C were preferable in practice.

A: Brightness of 300 cd/m$^2$ or more

B: Brightness of 290 cd/m$^2$ or more and less than 300 cd/m$^2$

C: Brightness of 280 cd/m$^2$ or more and less than 290 cd/m$^2$

D: Less than 280 cd/m$^2$

TABLE 6

|  | Backlight unit side | |
|---|---|---|
|  | Ra3 | P3 |
| Example 1 | 1,700 nm | H |
| Example 2 | 1,700 nm | H |
| Example 3 | 1,700 nm | H |
| Example 4 | 1,700 nm | H |
| Example 5 | 1,700 nm | H |
| Example 6 | 1,700 nm | H |
| Example 7 | 1,700 nm | H |
| Example 8 | 1,700 nm | H |
| Example 9 | 1,700 nm | H |
| Example 10 | 1,700 nm | H |
| Example 11 | 1,700 nm | H |
| Example 12 | 1,700 nm | H |
| Example 13 | 1,700 nm | H |
| Example 14 | 1,700 nm | H |
| Example 15 | 1,700 nm | H |
| Comparative Example 1 | 2 nm | 3H |
| Comparative Example 2 | 1,700 nm | H |
| Comparative Example 3 | 1,700 nm | H |
| Comparative Example 4 | 1,700 nm | H |
| Comparative Example 5 | 1,700 nm | H |
| Comparative Example 6 | 1,700 nm | H |
| Comparative Example 7 | 1,700 nm | H |

The present invention is useful in the technical field of the liquid crystal display device.

What is claimed is:

1. A liquid crystal display device comprising:
   a liquid crystal panel at least including a liquid crystal cell and a polarizing plate; and
   a backlight unit at least including a light source, wherein an outermost surface of the liquid crystal panel on a backlight unit side is a surface of a protective film included in the polarizing plate, wherein an outermost surface of the backlight unit on a liquid crystal panel side is a surface of a diffusion member included in the backlight unit, and wherein, in a case where an arithmetic mean roughness measured on the outermost surface of the liquid crystal panel on the backlight unit side is set as Ra1, a pencil hardness measured on the outermost surface of the liquid crystal panel on the backlight unit side is set as P1, an arithmetic mean roughness measured on the outermost surface of the backlight unit on the liquid crystal panel side is set as Ra2, and a pencil hardness measured on an outermost surface of the backlight unit on the liquid crystal panel side is set as P2, Expressions 1 to 3 are satisfied:

$$33 \text{ nm} < Ra1 < 135 \text{ nm} \qquad \text{Expression 1:}$$

$$Ra2 < 15 \text{ nm} \qquad \text{Expression 2:}$$

$$P1 < P2. \qquad \text{Expression 3:}$$

2. The liquid crystal display device according to claim 1, wherein the backlight unit includes a light collecting member between the diffusion member and the light source.

3. The liquid crystal display device according to claim 2, wherein the protective film is a resin film including a particle having an average particle diameter in the range of 0.1 to 6.0 μm.

4. The liquid crystal display device according to claim 2, wherein the protective film is an acrylic resin film.

5. The liquid crystal display device according to claim 4, wherein the acrylic resin film includes an acrylic resin particle having an average particle diameter in the range of 0.1 to 6.0 μm.

6. The liquid crystal display device according to claim 1, wherein an arithmetic mean roughness Ra3 measured on a surface of the diffusion member on a light source side is more than 500 nm to 10,000 nm or less.

7. The liquid crystal display device according to claim 6, wherein the protective film is a resin film including a particle having an average particle diameter in the range of 0.1 to 6.0 μm.

8. The liquid crystal display device according to claim 6, wherein the protective film is an acrylic resin film.

9. The liquid crystal display device according to claim 8, wherein the acrylic resin film includes an acrylic resin particle having an average particle diameter in the range of 0.1 to 6.0 μm.

10. The liquid crystal display device according to claim 1, wherein the protective film is an acrylic resin film.

11. The liquid crystal display device according to claim 10, wherein the acrylic resin film includes an acrylic resin particle having an average particle diameter in the range of 0.1 to 6.0 μm.

12. The liquid crystal display device according to claim 1, wherein the protective film is a resin film including a particle having an average particle diameter in the range of 0.1 to 6.0 μm.

13. The liquid crystal display device according to claim 1, wherein the protective film is a cellulose acylate film.

* * * * *